Oct. 18, 1932.  A. O. TRIMMER  1,883,129
TURBINE
Filed Feb. 14, 1929   2 Sheets-Sheet 1
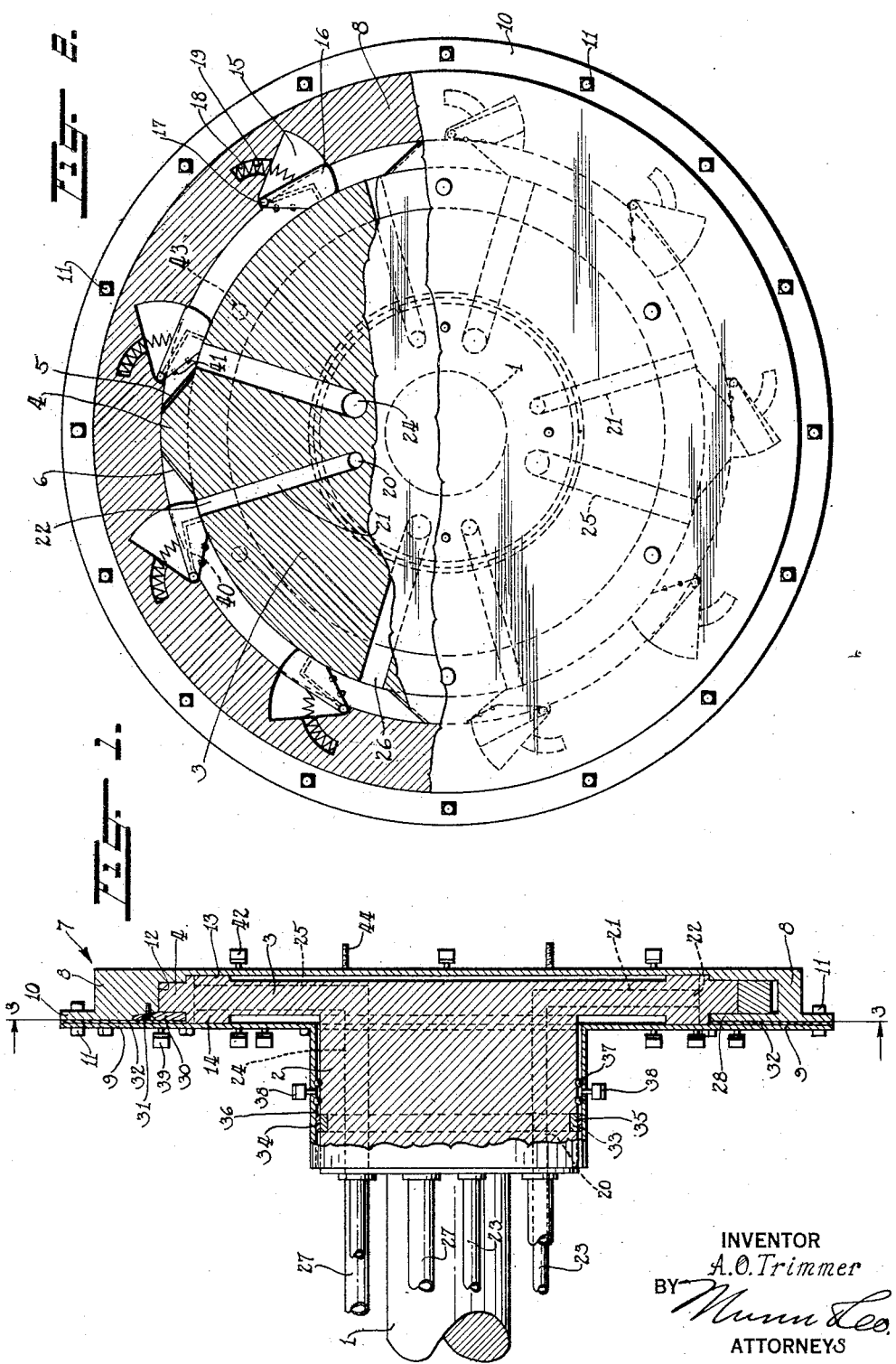
INVENTOR
*A.O.Trimmer*
BY
ATTORNEYS Oct. 18, 1932.   A. O. TRIMMER   1,883,129
TURBINE
Filed Feb. 14, 1929   2 Sheets-Sheet 2

INVENTOR
A. O. Trimmer
BY Munn & Co.
ATTORNEYS

Patented Oct. 18, 1932

1,883,129

UNITED STATES PATENT OFFICE

ALBERT O. TRIMMER, OF CERRO GORDO, ILLINOIS

TURBINE

Application filed February 14, 1929. Serial No. 339,973.

My invention relates to improvements in turbines, and it consists in the combinations, constructions, and arrangements herein described and claimed.

An object of my invention is to provide a turbine which may be efficiently operated by any fluid such as oil, air, water, steam, etc.

A further object of my invention is to provide a turbine which may be used in connection with wheels for automobiles or the like, locomotive wheels, as a pulley, or as a means for actuating a drive shaft, etc.

A further object of my invention is to provide a turbine in which back pressure is reduced to a minimum.

A further object is to provide a turbine in which means is provided for preventing the turbine from stopping at a dead center.

A further object of my invention is to provide a turbine which will operate efficiently in various positions.

Other objects and advantages will appear in the following specification, and the novel features of the invention will be particularly pointed out in the appended claim.

Figure 3:
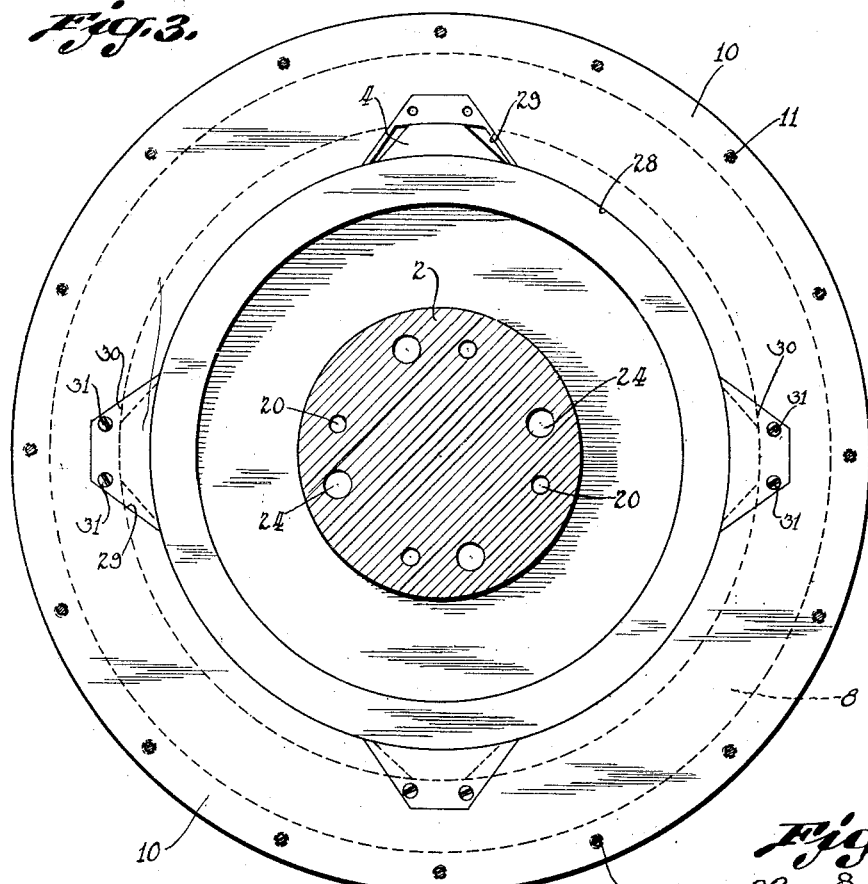
Figure 4:
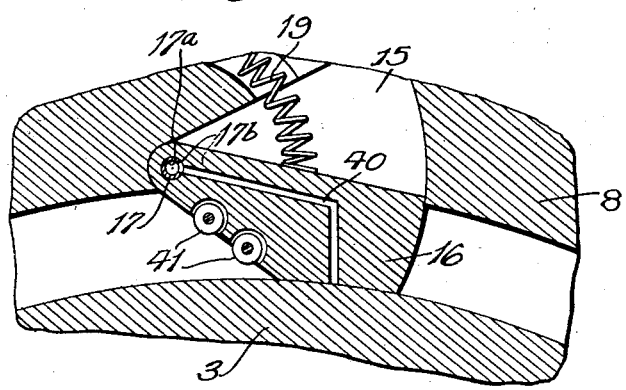
Figure 5:
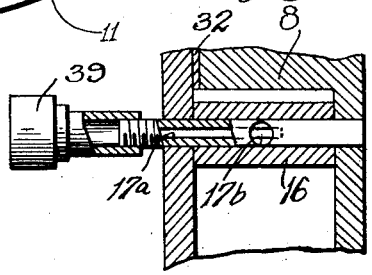
Figure 6:
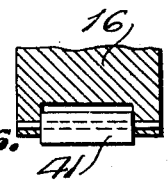

My invention is illustrated in the accompanying drawings forming part of this application, in which Figure 1 is a side elevation partly in section of my device, Figure 2 is a face view partly in section of the device shown in Figure 1, Figure 3 is a sectional view taken along the line 3—3 of Figure 1, Figure 4 is an enlarged fragmentary sectional view of the piston means utilized in my invention, Figure 5 is an enlarged fragmentary sectional view, partly in elevation, of a portion of the rotor, and Figure 6 is an enlarged sectional view showing one form of the roller utilized in the piston means employed in my invention.

In carrying out my invention I make use of a shaft 1 having an enlarged portion 2 and a disc portion 3. The structure so far defined is a one-piece construction and may be termed the stator. The disc portion 3 is provided with a plurality of abutments 4 equally spaced about the periphery of the disc and provided with inclined surfaces 5 and 6. A rotor 7 is rotatably mounted upon the disc portion 3 and the enlarged portion 2 as shown in Figure 1. The rotor 7 comprises an outer casing 8 and a cover portion 9. The casing 8 is provided with a flange 10. The cover 9 may be secured to the casing 8 by means of bolts 11 which pass through the cover and the flange 10 shown in Figures 1 and 2. The casing 8 is grooved as at 12 for receiving the abutments 4. The disc portion 3 is provided with annular raised portions 13 and 14 for frictionally engaging the casing 8 and the cover 9 respectively.

In referring to Figure 2 it will be seen that the casing 8 of the rotor is provided with a plurality of recesses 15 within which pistons 16 are pivotally secured by hollow pins at 17. Each of the recesses 15 is provided with a bore 18 within which a spring 19 is placed. The springs 19 bear against the pistons 16 for holding the dogs yieldingly in engagement with the periphery of the disc portion 3 of the stator.

The enlarged portion 2 is provided with a plurality of intake openings 20 formed to pass through the disc portion 3 as at 21, see Figure 1, for providing intake ports 22. Each of the intake openings 20 is provided with a tube or pipe 23 which is secured to the enlarged portion 2. The enlarged portion 2 is also provided with a plurality of exhaust openings 24 passing through the disc portion 3 as at 25 for forming exhaust ports 26.

It will be seen in referring to Figure 2 that the intake ports 22 and the exhaust ports 26 are positioned near the bases of the abutments 4 and upon opposite sides thereof. The exhaust openings 24 are provided with a plurality of pipes or tubes 27 which are secured to the enlarged portion 2.

In forming the groove 12 a flange portion 28 is provided as shown in Figure 1. The flange portion 28 is cut away as at 29, see Figure 3, for permitting the rotor 7 to be mounted upon the stator. The cut-away portions 29 are aligned with respect to the abutments 4. When the outer casing 8 is placed upon the stator, the abutments 4 are passed through the openings provided by the cutaway portions 29. At this time the plates 30 are secured to the outer casing by means of screws or bolts 31 thereby locking the abutments 4 within the groove 12. A suitable gasket 32 may be placed between the cover 9 and the outer casing 8 as shown in Figure 1.

The enlarged portion 2 is grooved at 33, see Figure 1, for receiving a ring comprising a metal ring 34 made of any suitable spring material, and a felt portion 35. The metal portion of the ring fits snugly against the inner surface of the sleeve portion 36 associated with the cover 9. The ring remains stationary during the operation of the device and effectively prevents leakage of any fluid. Suitable ball or roller bearings 37 may be provided as shown in Figure 1. Suitable grease or oil cups 38 are provided for lubricating the bearings 37. The periphery of the disc 3 and the abutments 4 are lubricated by means of oil or grease cups 39, as shown in Figures 1 and 5, which are arranged to force oil or grease through an opening 17a and an opening 17b of the pin 17 and an opening 40 in each of the pistons 16, see Figure 2.

From the foregoing description of the various parts of the device, the operation thereof may be readily understood. In assembling, the cover 9 is placed upon the enlarged portion 2 and the outer casing 9 is then placed upon the disc portion 3. Before the casing 8 is placed upon the disc portion 3, the plates 30 are removed. After the casing 8 has been placed in position, the plates 30 are secured to the casing by means of the bolts 31. The cover 9 is then rigidly secured to the outer casing 8 by means of the bolts 11.

In operation, motive fluid under pressure is passed through the inlet tubes or pipes 23 and the inlet openings 20. Normally the pistons 16 engage the periphery of the disc 3 by reason of the springs 19. In operation, the motive fluid is passed into the recesses provided by the groove 12 near the bases of the abutments 4. The motive fluid will be forced into the groove 12 and will cause the rotor 7 to rotate with respect to the stator by reason of the pistons 16.

During the rotation of the rotor the pistons 16 will engage the abutments 4 which will result in the movement of the dogs into the recesses 15. As each dog approaches an abutment, the motive fluid will exhaust through the exhaust openings 24. In referring to Figure 2 it will be seen that the exhaust openings are considerably larger than the inlet openings. The pistons 16 are provided with suitable roller or ball bearings 41 which engage the peripheral surfaces of the abutments 4. The rotor and the stator are lubricated by means of suitable grease or oil cups 42 which are positioned as at 43, see Figure 2.

The tubes or pipes 23 and 27 may be of a flexible type if this is desired. It will be seen in referring to Figure 1 that I have provided suitable bolts 44 to which a wheel or a pulley may be secured.

I claim:

A device of the type described comprising a stator having a disc portion provided with a plurality of abutments, a rotor mounted for movement upon said disc portion, said rotor being provided with a circular recess substantially equal in diameter to the diameter of said disc portion and arranged for receiving the same, said rotor being provided with a groove communicating with said recess for receiving said abutments, said rotor being provided with cutaway portions for receiving said abutments, and plate means for closing said cutaway portions.

Signed at Cerro Gordo, in the county of Piatt and State of Ill., this 4th day of February, A. D. 1929.

ALBERT O. TRIMMER.